(12) United States Patent
Sanekata et al.

(10) Patent No.: US 12,281,625 B2
(45) Date of Patent: Apr. 22, 2025

(54) VALVE DEVICE

(71) Applicant: MIKUNI CORPORATION, Tokyo (JP)

(72) Inventors: Yuuhei Sanekata, Odawara (JP); Keigo Suzuki, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/477,023

(22) Filed: Sep. 28, 2023

(65) Prior Publication Data

US 2024/0117773 A1  Apr. 11, 2024

(30) Foreign Application Priority Data

Oct. 6, 2022 (JP) .................................. 2022-161430
Aug. 1, 2023 (JP) .................................. 2023-125690

(51) Int. Cl.
*F02D 9/10* (2006.01)
*F16K 31/04* (2006.01)
*F16K 37/00* (2006.01)

(52) U.S. Cl.
CPC ........... *F02D 9/1065* (2013.01); *F02D 9/108* (2013.01); *F16K 31/047* (2013.01); *F16K 37/0041* (2013.01)

(58) Field of Classification Search
CPC ...... F02D 9/1065; F02D 9/108; F16K 31/047; F16K 37/0041
USPC .......................................................... 251/248
See application file for complete search history.

(56) References Cited

FOREIGN PATENT DOCUMENTS

| EP | 2530284 A2 * | 12/2012 | ............... F02D 9/10 |
|---|---|---|---|
| JP | 2010151567 A * | 7/2010 | |
| JP | 2017-173089 A | 9/2017 | |

* cited by examiner

*Primary Examiner* — Mahmoud Gimie

(57) ABSTRACT

In a valve device including: a plate-shaped drive gear provided at an end of a valve shaft made of metal; and, at the drive gear, a detection target of an inductive sensor detecting a rotation angle of the valve shaft, the drive gear has a lever member made of metal and integrated through insert molding in which a part thereof is exposed in the inner surface, the detection target is integrated along with the lever member through the insert molding on a side of the outer surface of the drive gear, and an exposure portion of the lever member at the drive gear including the lever member and the detection target and the end of the valve shaft are caused to abut each other, and a rear side of the abutting part is laser-welded from the side of an outer hole and is fixed thereby to configure a shaft unit.

5 Claims, 6 Drawing Sheets

VALVE DEVICE

CROSS REFERENCE TO RELATED APPLICATIONS

This application claims priority benefit from Japanese Patent Application No. 2022-161430 filed on Oct. 6, 2022 and Japanese Patent Application No. 2023-125690 filed on Aug. 1, 2023 the contents of each of which are incorporated herein by reference.

BACKGROUND OF THE INVENTION

Field of the Invention

The present invention relates to a rotation angle detection structure for a valve device that detects a rotation angle by using an inductive sensor.

Description of the Related Art

Many valves such as throttle valves include aperture sensors that detect apertures. As the aperture sensors, inductive sensors (non-contact sensors) that detect rotation angles (rotation positions) of valve shafts are used.

The inductive sensors include detection targets that are conductive bodies made of metal in the valve shafts, include sensor coils near the conductive bodies, generate high-frequency magnetic fields by causing currents to flow through sensor coils, detect inductance of the sensor coils changing due to the detection targets moving in the magnetic fields, and thereby detect the rotation angles of the valve shafts.

A valve device described in Japanese Patent Laid-Open No. 2017-173089, for example, has a configuration in which a detection target of an inductive sensor is formed of a thin metal plate and the detection target is assembled with a rotor unit fixed to a valve shaft.

However, the detection target of the inductive sensor is a relatively small component formed of a thin plate in many cases as in Japanese Patent Laid-Open No. 2017-173089. Therefore, it is necessary to pay attention to handling to prevent the detection target from being bent or damaged when the detection target is assembled with the rotor unit, and there is a problem that the assembly requires effort. In addition, there is also a problem that attention is to be paid to prevent the detection target from being damaged when the detection target is stored as a component.

The present invention was made in view of such a problem, and an object thereof is to provide a valve device including a detection target of a non-contact sensor in a valve shaft, facilitating handing of components included in the valve shaft, and facilitating manufacturing.

SUMMARY OF THE INVENTION

In order to achieve the above object, a valve device according to the present invention is a valve device including: a plate-shaped gear made of a resin and provided at a shaft made of metal driving a valve body, and a detection target of a non-contact sensor detecting a rotation angle of the shaft is provided on the gear, in which the gear has a support member made of metal and integrated through insert molding in a state where at least a part of the support member is exposed in one side surface, the detection target is integrated into the gear along with the support member through the insert molding on a side of the other side surface of the gear, and a shaft unit is configured to an exposure portion of the support member at the gear after the insert molding and the end of the shaft are welded.

Preferably, the gear has an exposure hole exposing at least a part of the support member on the side of the other side surface of the support member, and the exposure portion of the support member is abutted on the end of the shaft each other, and a rear side of an abutting part of the support member is irradiated with laser light through the exposure hole from the side of the other side surface of the gear to weld the support member and the shaft.

Preferably, the detection target is formed into a hollow shape to surround a periphery of the exposure hole.

Preferably, the gear includes an insertion hole into which the end of the shaft is insertable at an arbitrary relative rotation position around an axial line.

Preferably, the valve device is a throttle valve controlling an amount of air intake of an internal combustion engine.

According to the valve device of the present invention, the gear included in the shaft driving the valve body is insert-molded to include the support member made of metal and the detection target of the non-contact sensor. Also, the exposure portion of the support member at the gear including the support member and the detection target and the end of the shaft are welded to configure a shaft unit. Therefore, since the detection target of the non-contact sensor is a component included in advance through the insert molding in the gear before the welding, and it is easy to handle the detection target even if the size is small.

Also, it is possible to easily manufacture the shaft unit by welding the exposure portion of the support member at the gear and the end of the shaft.

DETAILED DESCRIPTION OF THE INVENTION

Hereinafter, an embodiment of the present invention will be described on the basis of the drawings.

Figure 1:
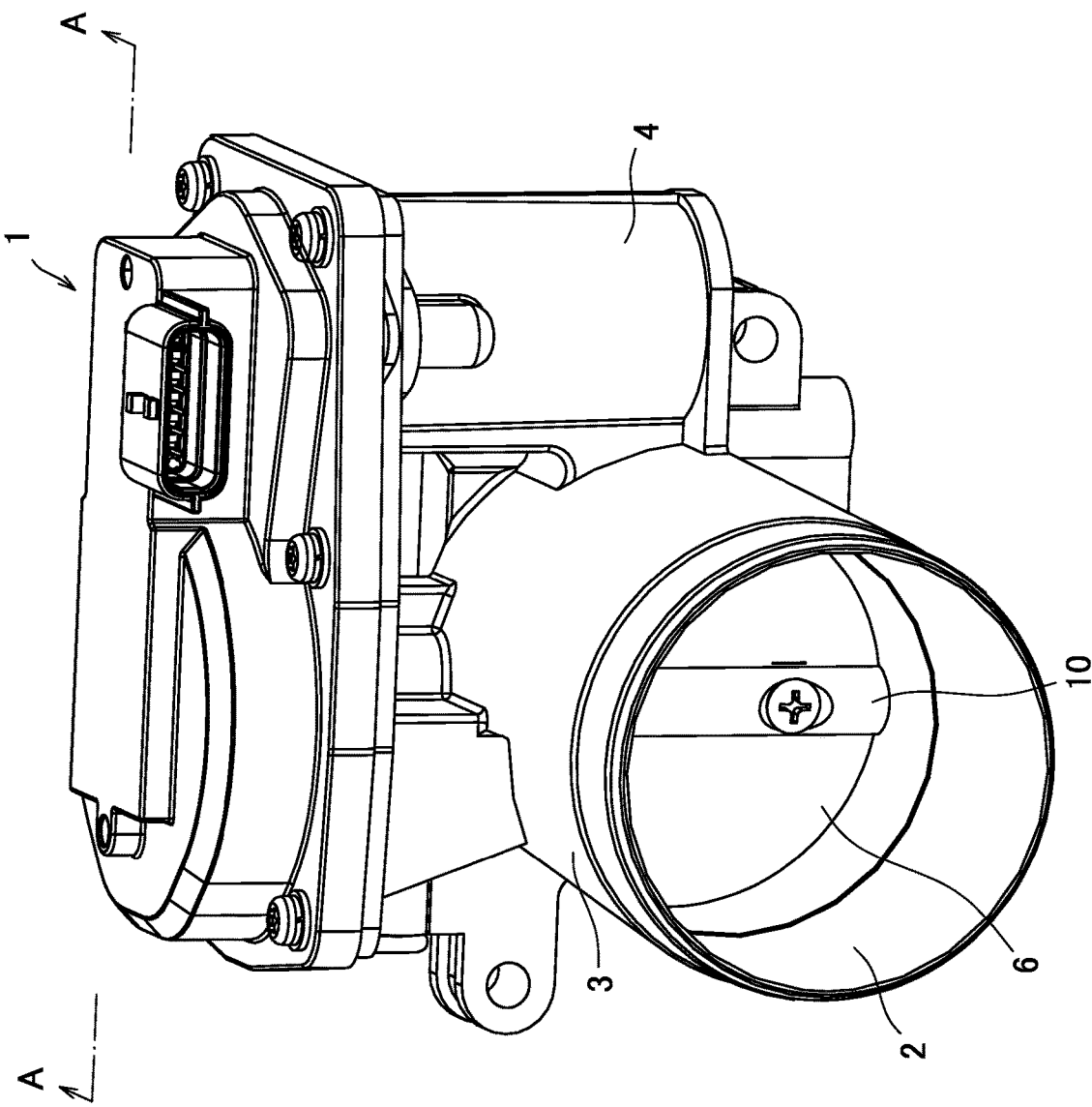
FIG. 1 is a perspective view of a valve device according to an embodiment of the present invention.
Figure 2:
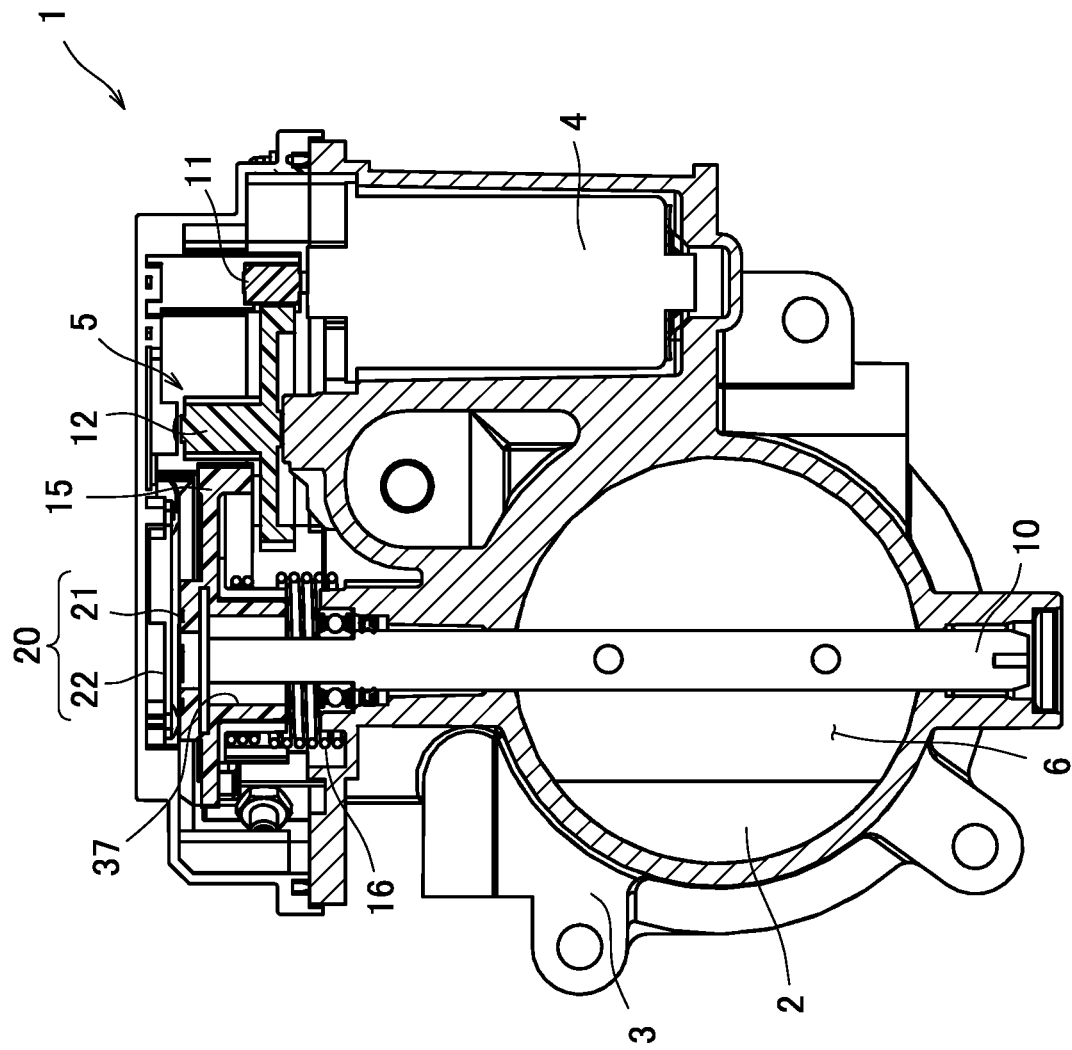
FIG. 2 is a vertical sectional view of the valve device according to the embodiment.

FIG. 1 is a perspective view of a valve device 1 according to an embodiment of the present invention. FIG. 2 is a vertical sectional view of the valve device 1 according to the embodiment. Note that FIG. 2 is a sectional view along the A-A part illustrated in FIG. 1.

The valve device 1 according to the embodiment of the present invention is, for example, a throttle valve and is placed in an intake passage of an internal combustion engine to control the amount of air intake.

As illustrated in FIGS. 1 and 2, the valve device 1 includes an electric motor 4 and a decelerator 5 in a casing 3 with a fluid passage 2 as a part of the intake passage formed therein. The valve device 1 includes a valve body 6 that opens and closes the fluid passage 2 and a valve shaft 10 (shaft) rotatably supported by the casing 3 and disposed to traverse the fluid passage 2. The valve body 6 is fixed to the valve shaft 10.

The decelerator 5 is configured of a motor gear 11 fixed to an output shaft of the electric motor 4, an intermediate gear 12 rotatably supported by the casing 3, and a drive gear 15 (gear) fixed to one end of the valve shaft 10, and power is transmitted from the electric motor 4 to the motor gear 11, the intermediate gear 12, and the drive gear 15 in order to drive and rotate the valve shaft 10.

A return spring 16 is included to be adjacent to the drive gear 15 in the vicinity of the one end of the valve shaft 10. The return spring 16 is a torsion coil spring wound around the valve shaft 10 and has one end locked at the drive gear 15 and the other end locked at the casing 3. The return spring 16 biases the valve shaft 10 in one rotation direction.

The casing 3 includes two stoppers that are not illustrated and abut the drive gear 15. The stoppers limit the rotation angle of the valve shaft 10 within a range of a predetermined angle (90 degrees, for example).

When power is not distributed to the electric motor 4, the valve shaft 10 is rotated by a biasing force of the return spring 16, and the fluid passage 2 is fully closed (or fully opened) by the valve body 6. The valve shaft 10 is rotated against the biasing force of the return spring 16 by distributing power to the electric motor 4, and the amount of air intake flowing through the fluid passage 2 is adjusted by the valve body 6 rotating.

An inductive sensor 20 (non-contact sensor) that detects a rotation angle (rotation position) of the valve shaft 10 is included at one end of the valve shaft 10 on the side of the drive gear 15.

The inductive sensor 20 includes a detection target 21 provided at the drive gear 15 and made of metal and a sensor main body 22 fixed to the casing 3 and disposed near the detection target 21 to face it.

The sensor main body 22 of the inductive sensor 20 includes, for example, a sensor coil, generates a high-frequency magnetic field by causing a current to flow through the sensor coil, detects inductance of the sensor coil that is changed by the detection target moving in the magnetic field, and thereby detects a rotation angle of the valve shaft 10.

Figure 3:
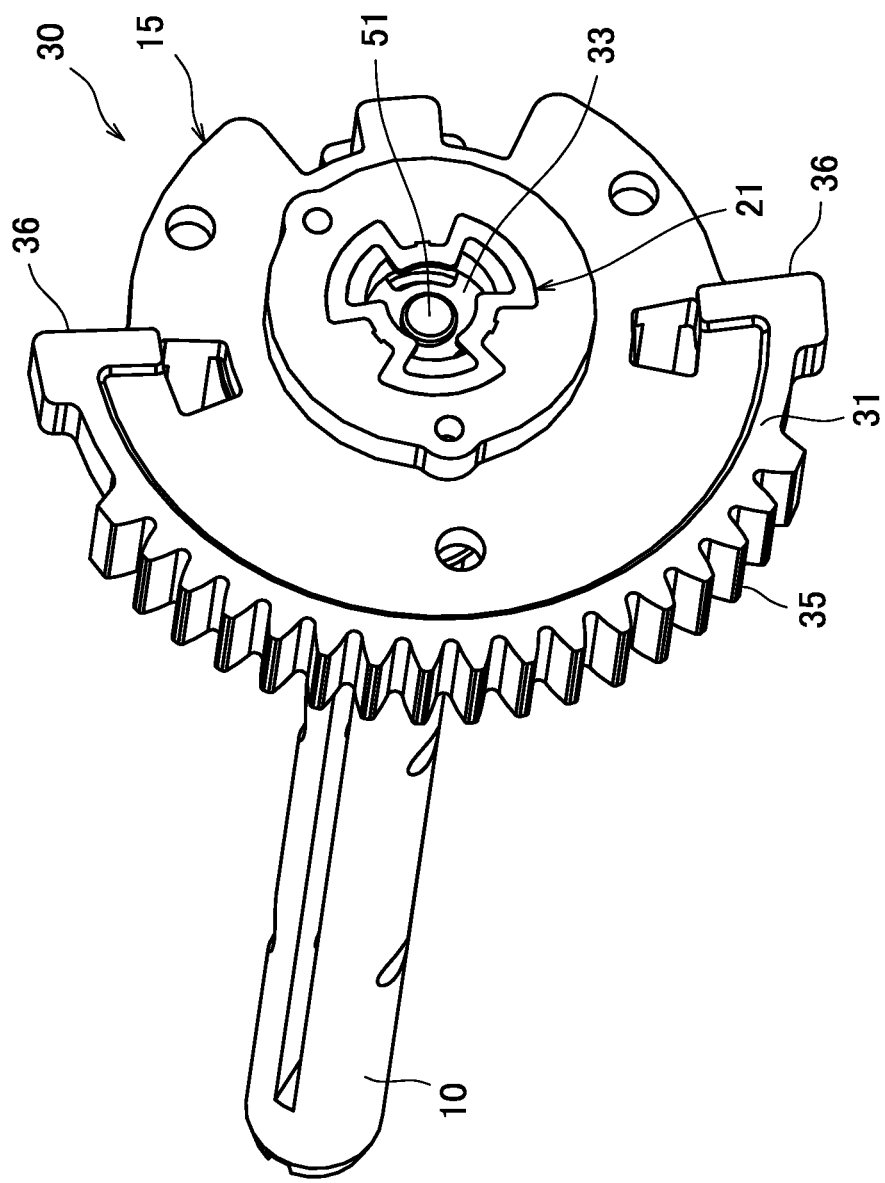
FIG. 3 is a perspective view of a valve shaft unit.
Figure 4:
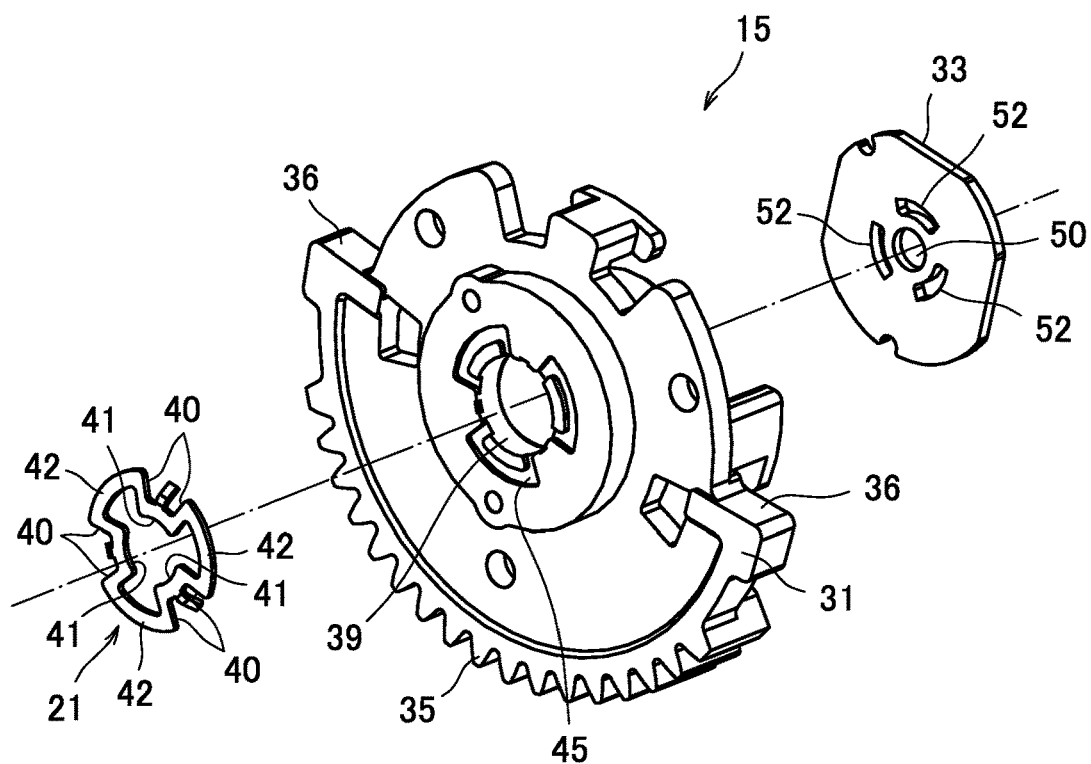
FIG. 4 is a diagram illustrating components of a drive gear in the valve shaft unit.
Figure 5:
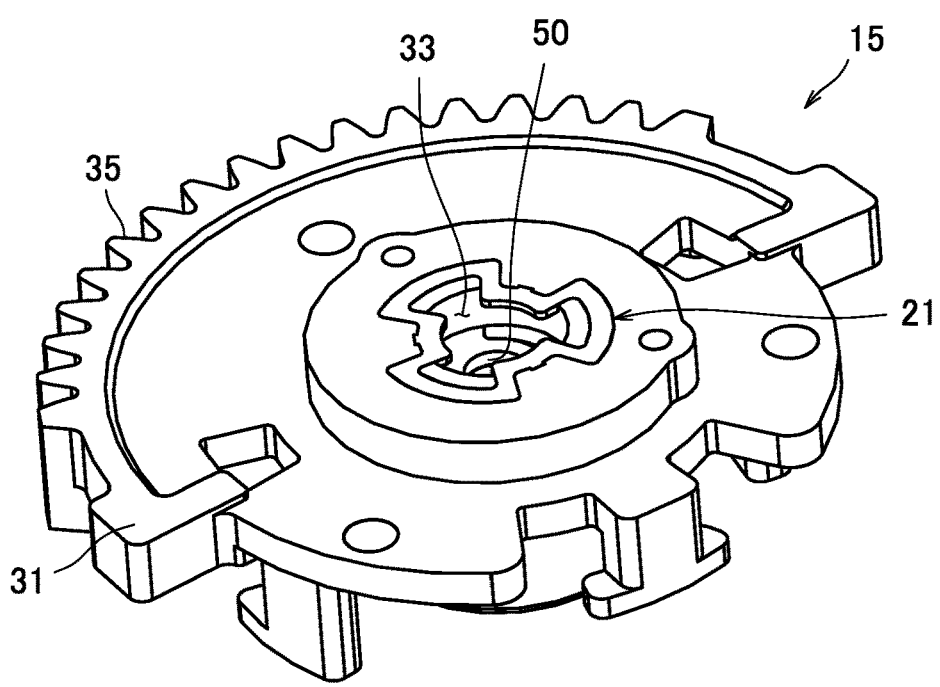
FIG. 5 is a perspective view of the drive gear in the valve shaft unit.
Figure 6:
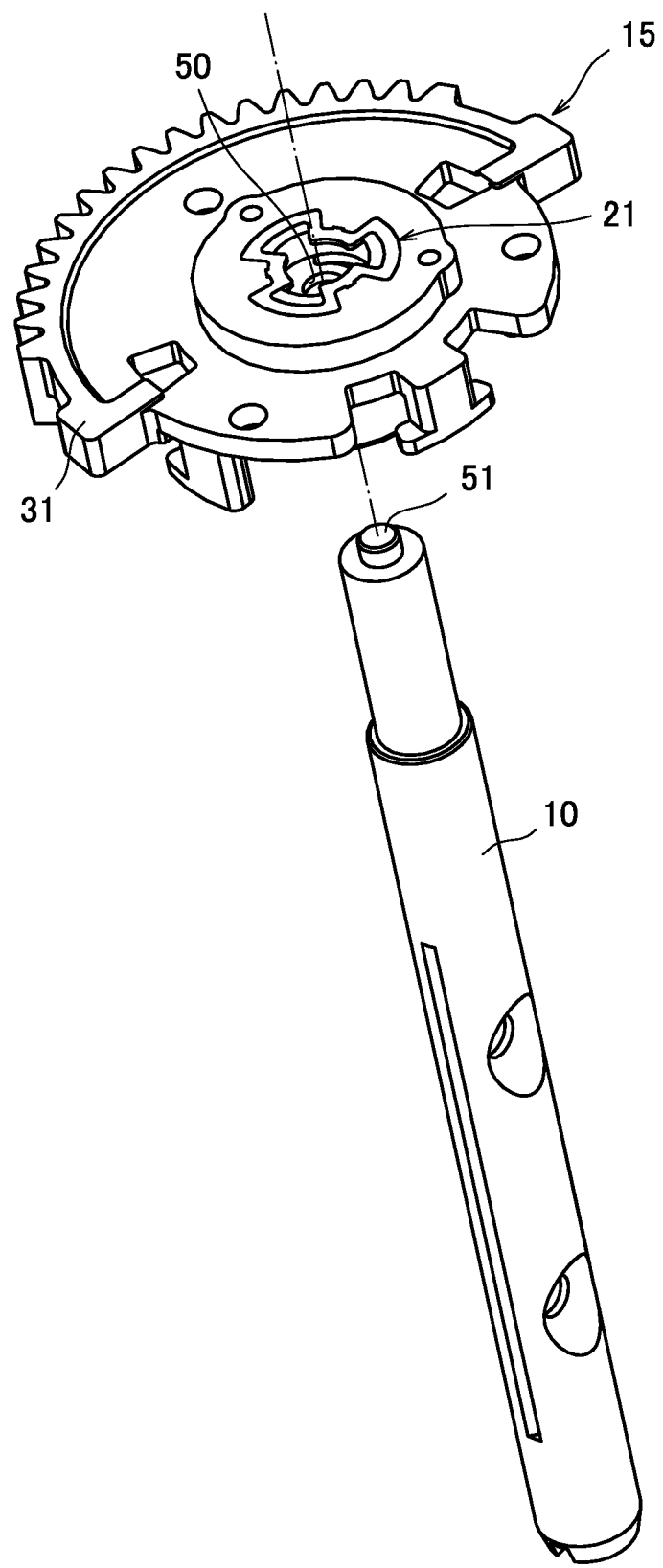
FIG. 6 is a perspective view of the drive gear and a valve shaft in the valve shaft unit.
Figure 7:
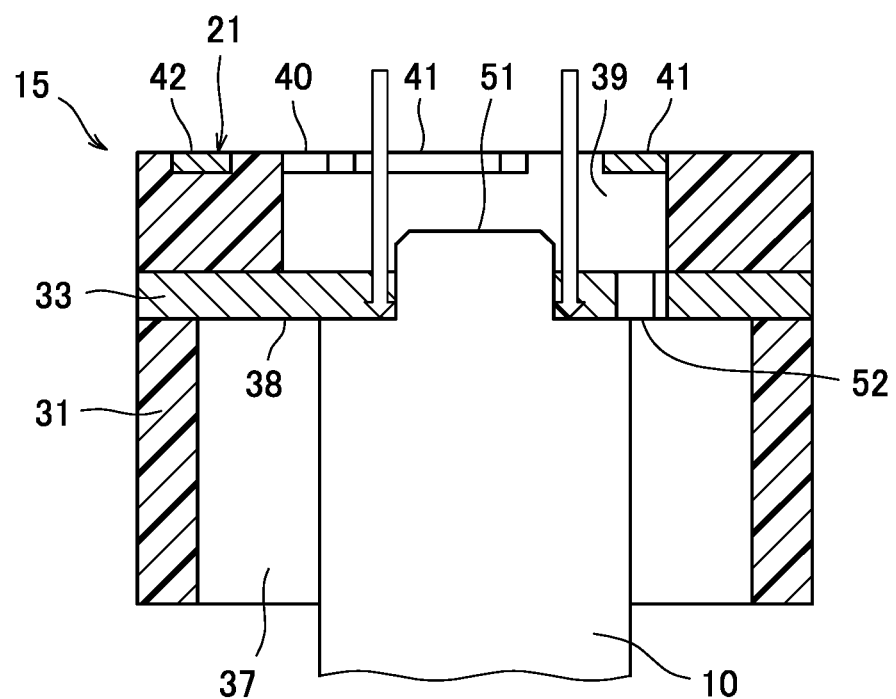
FIG. 7 is an explanatory diagram illustrating a method for fixing the drive gear and the valve shaft.

FIG. 3 is a perspective view of a valve shaft unit 30. FIG. 4 is a diagram illustrating components of the drive gear 15 in the valve shaft unit 30. FIG. 5 is a perspective view of the drive gear 15 in the valve shaft unit 30. FIG. 6 is a perspective view of the drive gear 15 and the valve shaft 10 in the valve shaft unit 30. FIG. 7 is an explanatory diagram illustrating a method for fixing the drive gear 15 and the valve shaft 10. Note that FIG. 7 is a vertical sectional view of a part where the drive gear 15 and the valve shaft 10 are fixed.

As illustrated in FIGS. 3 and 4, the valve shaft unit 30 is configured of the valve shaft 10 and the drive gear 15 made of metal. The drive gear 15 is configured of a gear portion 31 made of a resin, the detection target 21 of the inductive sensor 20, and a lever member 33 (support member) made of metal.

The gear portion 31 is a component with a substantially disk shape formed of a resin, and a gear 35 (for example, a spur gear) is formed over a substantially half (about 180 degrees) of an outer circumferential end thereof. Stopper abutting surfaces 36 that abut the stoppers that are included in the casing 3 and are not illustrated to limit rotation are provided at both ends of the outer circumferential portion in the circumferential direction where the gear 35 is formed. A circular shaft attachment hole 37 (insertion hole) into which the valve shaft 10 is inserted is included (see FIGS. 2, 6 and 7) at the center of an inner surface of the gear portion 31 (the surface on the side opposite to the surface facing the sensor main body 22; one side surface in the present invention). Note that the shaft attachment hole 37 has a diameter that is slightly larger than the outer diameter of the valve shaft 10. The center portion of the lever member 33 is exposed to the inside of the shaft attachment hole 37 (an exposure portion 38 illustrated in FIG. 7).

An outer hole 39 (exposure hole) with a diameter that is smaller than the shaft attachment hole 37 and is larger than the valve shaft 10 is included at the center of the outer surface of the gear portion 31 (the surface facing the sensor main body 22; the other side surface in the present invention). The outer hole 39 and the shaft attachment hole 37 penetrate through the center of the gear portion 31.

The detection target 21 has six radial-direction members 40 having substantially disk shapes of thin plates hollowed out at the centers and extending in the radial direction, three inner circumferential-direction members 41 extending in the circumferential direction and coupling ends of the radial-direction members 40 on the center side, and three outer circumferential-direction members 42 extending in the circumferential direction and coupling ends of the radial-direction members 40 on the outer side. All the radial-direction members 40, the inner circumferential-direction members 41, and the outer circumferential-direction members 42 have widths and thicknesses of about several mm. The radial-direction members 40 are disposed at equal intervals in the circumferential direction, ends thereof on the center side are coupled to one every two inner circumferential-direction members 41, and ends thereof on the outer side are coupled to one every two the outer circumferential-direction members 42 with deviation from the inner circumferential-direction member 41 in the circumferential direction.

The detection target 21 is disposed coaxially with the center of the gear portion 31 in the outer surface of the gear portion 31 on the side of the outer hole 39. Also, the positions of the outer end surfaces in the radial direction of the inner circumferential-direction members 41 of the detection target 21 and of the edge portions of the outer hole 39 of the gear portion 31 in the radial direction are substantially the same.

Grooves 45 that accommodate the outer circumferential-direction members 42 and the radial-direction members 40 are formed in the outer side surface of the gear portion 31.

The lever member 33 is made of metal, has a flat plate shape, and is buried inside the gear portion 31. A circular center hole 50 that is smaller than the outer diameter of the valve shaft 10 opens at the center of the lever member 33. Note that a columnar projecting portion 51 projecting in the axial direction is included at one end of the valve shaft 10, and the projecting portion 51 is inserted into the center hole 50 of the lever member 33. The center hole 50 of the lever member 33 has a diameter that is smaller than that of inner end surfaces of the inner circumferential-direction members 41 of the detection target 21 in the radial direction.

Also, three arc holes 52 extending in arc shapes are open in the periphery of the center hole 50 in the lever member 33. The three arc holes 52 have substantially the same shapes and sizes as those of the inner circumferential-direction members 41 of the detection target 21 and are disposed at substantially the same positions as those of the inner circumferential-direction members 41 in the radial direction and the circumferential direction.

As illustrated in FIG. 5, the gear portion 31, the lever member 33, and the detection target 21 are integrated through insert molding thereby to form the drive gear 15 that is one component. The gear portion 31 is formed of a resin by using the lever member 33 and the detection target 21 made of metal as insert articles. In other words, the lever member 33 and the detection target 21 are combined at the timing when the resin molding of the gear portion 31 is completed.

As illustrated in FIG. 6, the valve shaft 10 is fixed to the drive gear 15 including the lever member 33 and the detection target 21 to thereby manufacture the valve shaft unit 30.

Specifically, one end of the valve shaft 10 is inserted into the shaft attachment hole 37 in the gear portion 31 of the drive gear 15, the one end of the valve shaft 10 is caused to abut the exposure portion 38 of the lever member 33 exposed from the shaft attachment hole 37, and the projecting portion 51 of the valve shaft 10 is inserted into the center hole 50 of the lever member 33, as illustrated in FIG. 7.

Also, the lever member 33 exposed to the inside of the outer hole 39 is irradiated with laser light from the side of the outer surface of the drive gear 15 to weld the lever member 33 and the valve shaft 10 as illustrated by the arrow in FIG. 7. Note that the position of the irradiation with the laser light is the rear side of the abutting surfaces of the one end of the valve shaft 10 and the lever member 33, and the entire periphery of the projecting portion 51 may be welded through the laser welding, or the welding may be performed at three locations on the inner side of the arc holes.

In this manner, the valve shaft unit 30 that includes the drive gear 15 including the lever member 33 and the detection target 21 and the valve shaft 10 is manufactured.

As described above, the drive gear 15 is fixed to the end of the valve shaft 10 to which the valve body 6 is fixed to transmit power from the electric motor 4 in the valve device 1 in the present embodiment.

In the present embodiment, the lever member 33 made of metal is included through insert molding inside the gear portion 31 made of a resin in the drive gear 15. Also, the gear portion 31 includes the detection target 21 of the inductive sensor 20. The detection target 21 is also incorporated along with the lever member 33 when the gear portion 31 is manufactured. Therefore, the drive gear 15 integrated into the lever member 33 and the detection target 21 is manufactured as a component.

Also, the drive gear 15 is fixed to the valve shaft 10 by fixing the lever member 33 in the drive gear 15 including the lever member 33 and the detection target 21 and the end of the valve shaft 10 through the laser welding.

It is thus possible to manufacture and prepare in advance the drive gear 15 including the detection target 21 as a component. Although the detection target 21 itself is a small component, the handling thereof is facilitated by forming the detection target 21 as a component included in advance in the drive gear 15. Moreover, it is possible to easily manufacture the valve shaft unit 30 by fixing the drive gear 15 including the detection target 21 through the laser welding in the assembly of the valve device 1, for example.

The drive gear 15 after the insert molding includes the shaft attachment hole 37 provided on the side of the one side surface (inner surface) with the center of the lever member 33 exposed therefrom and includes the outer hole 39 provided on the side of the other side surface (outer surface) with the rear side of the exposure portion 38 of the lever member 33 exposed therefrom. Also, the end of the valve shaft 10 is caused to abut the exposure portion 38 of the lever member 33 seen from the shaft attachment hole 37, and the rear side of the abutting part of the lever member 33 with the valve shaft 10 is irradiated with the laser light through the outer hole 39 from the side of the outer surface of the drive gear 15 to weld the lever member 33 and the valve shaft 10 in the assembly of the valve device 1. It is thus possible to easily fix the drive gear 15 and the valve shaft 10.

Furthermore, the detection target 21 has a hollow shape surrounding the periphery of the outer hole 39, and it is thus possible to irradiate the rear surface of the abutting part between the lever member 33 and the valve shaft 10 through the hollow portion of the detection target 21 and the outer hole 39 when the rear side is irradiated with the laser light from the side of the outer hole 39 of the drive gear 15.

Also, the end of the valve shaft 10 has a circular section, and the shaft attachment hole 37 into which the valve shaft 10 of the drive gear 15 is inserted has also a larger circular shape than the valve shaft 10, such that the end of the valve shaft 10 can be inserted into the drive gear 15 at an arbitrary relative rotation position (rotation angle). Therefore, it is possible to fix the drive gear 15 at an arbitrary rotation position with respect to the rotation position of the valve body 6 with respect to the valve shaft 10. It is thus possible to manufacture the valve shaft unit 30 with different attachment angles of the drive gear 15 with one type of drive gear 15 and valve shaft 10.

Although the description of the embodiment has been provided hitherto, aspects of the present invention are not limited to the above embodiment. For example, detailed shapes of various components, such as the shape of the gear portion 31 of the drive gear 15, may be appropriately changed.

Also, although the present invention has been applied to a throttle valve in the above embodiment, it is possible to apply the present invention to various valve devices other than the throttle valve.

REFERENCE SIGNS LIST

1 Valve device
6 Valve body
10 Valve shaft (shaft)
15 Drive gear (gear)
20 Inductive sensor (non-contact sensor)
21 Detection target
30 Valve shaft unit
33 Lever member (support member)
37 Shaft attachment hole (insertion hole)
38 Exposure portion
39 Outer hole (exposure hole)

What is claimed is:
1. A valve device comprising:
a plate-shaped gear including a resin and provided at an end of a shaft made of metal driving a valve body, and
a detection target of a non-contact sensor detecting a rotation angle of the shaft provided on the gear,
wherein the gear has a support member made of metal and integrated through insert molding in a state where at least a part of the support member is exposed in one side surface,
the detection target is integrated into the gear along with the support member through the insert molding on a side of the other side surface of the gear, a shaft unit is configured to an exposure portion of the support member at the gear after the insert molding and the end of the shaft are welded, the gear has an exposure hole exposing at least a part of the support member on the side of the other side surface of the support member, and the exposure portion of the support member is abutted on the end of the shaft each other, and a rear side of an abutting part of the support member is irradiated with laser light through the exposure hole from the side of the other side surface of the gear to weld the support member and the shaft.

2. The valve device according to claim 1, wherein the detection target is formed into a hollow shape to surround a periphery of the exposure hole.

3. The valve device according to claim 1, wherein the gear includes an insertion hole into which an end of the shaft is insertable at an arbitrary relative rotation position around the axial line.

4. The valve device according to claim 1, wherein the valve device is a throttle valve controlling an amount of air intake of an internal combustion engine.

5. The valve device according to claim 3, wherein the valve device is a throttle valve controlling an amount of air intake of an internal combustion engine.

* * * * *